United States Patent [19]

Goodhue et al.

[11] Patent Number: 4,905,137
[45] Date of Patent: Feb. 27, 1990

[54] DATA BUS CONTROL OF ROM UNITS IN INFORMATION PROCESSING SYSTEM

[75] Inventors: Gregory K. Goodhue; William J. Price, both of San Jose; Ronald L. Treadway, Saratoga, all of Calif.; Brian M. Willis, Beaverton, Oreg.

[73] Assignee: North American Philips Corporation Signetics Division, Sunnyvale, Calif.

[21] Appl. No.: 136,249

[22] Filed: Dec. 18, 1987

[51] Int. Cl.[4] .................... G06F 12/00; G06F 12/06; G06F 12/08
[52] U.S. Cl. .................................. 364/200; 364/254; 364/254.3
[58] Field of Search ... 364/200 MS File, 900 MS File, 364/300

[56] References Cited

U.S. PATENT DOCUMENTS

| | | | |
|---|---|---|---|
| 4,158,227 | 6/1979 | Baxter et al. | 364/200 |
| 4,306,298 | 12/1981 | McElroy | 364/900 |
| 4,315,308 | 2/1982 | Jackson | 364/200 |
| 4,325,120 | 4/1982 | Colley et al. | 364/200 |
| 4,368,515 | 1/1983 | Nielsen | 364/200 |
| 4,381,542 | 4/1983 | Binder et al. | 364/200 |
| 4,407,016 | 9/1983 | Bayliss et al. | 364/200 |
| 4,495,571 | 1/1985 | Staplin, Jr. et al. | 364/200 |
| 4,675,808 | 6/1987 | Grinn et al. | 364/200 |

FOREIGN PATENT DOCUMENTS 55-16216 6/1979 Japan .
55-91030 7/1980 Japan .
2075225 11/1981 United Kingdom .

OTHER PUBLICATIONS

"Address Expansion Device", T. W. Glaser, IBM TDB, vol. 18, No. 12, 5/76, pp. 4118–4119.

Primary Examiner—David Y. Eng
Assistant Examiner—Robert B. Harrell
Attorney, Agent, or Firm—R. Meetin; A. Tamoshunas; T. Briody

[57] ABSTRACT

Page-mode-organized ROMs and associated circuitry are connected only to data and control buses in an information processing system. Addressing and reading of the ROMs are controlled by a processor without connecting the ROMs to an address bus. Selection of a particular ROM and of a particular page in the selected ROM is accomplished by applying a first control signal to the control bus and a first data word to the data bus. This first data word thus serves as the address of the selected page in the selected ROM. Then a particular byte of the selected page is selected by applying a second control signal to the control bus and a second data word to the data bus. This second data word serves as the address of the selected byte. Subsequently, in response to a third control signal, the selected byte is read out of the selected ROM and applied to the data bus.

3 Claims, 1 Drawing Sheet

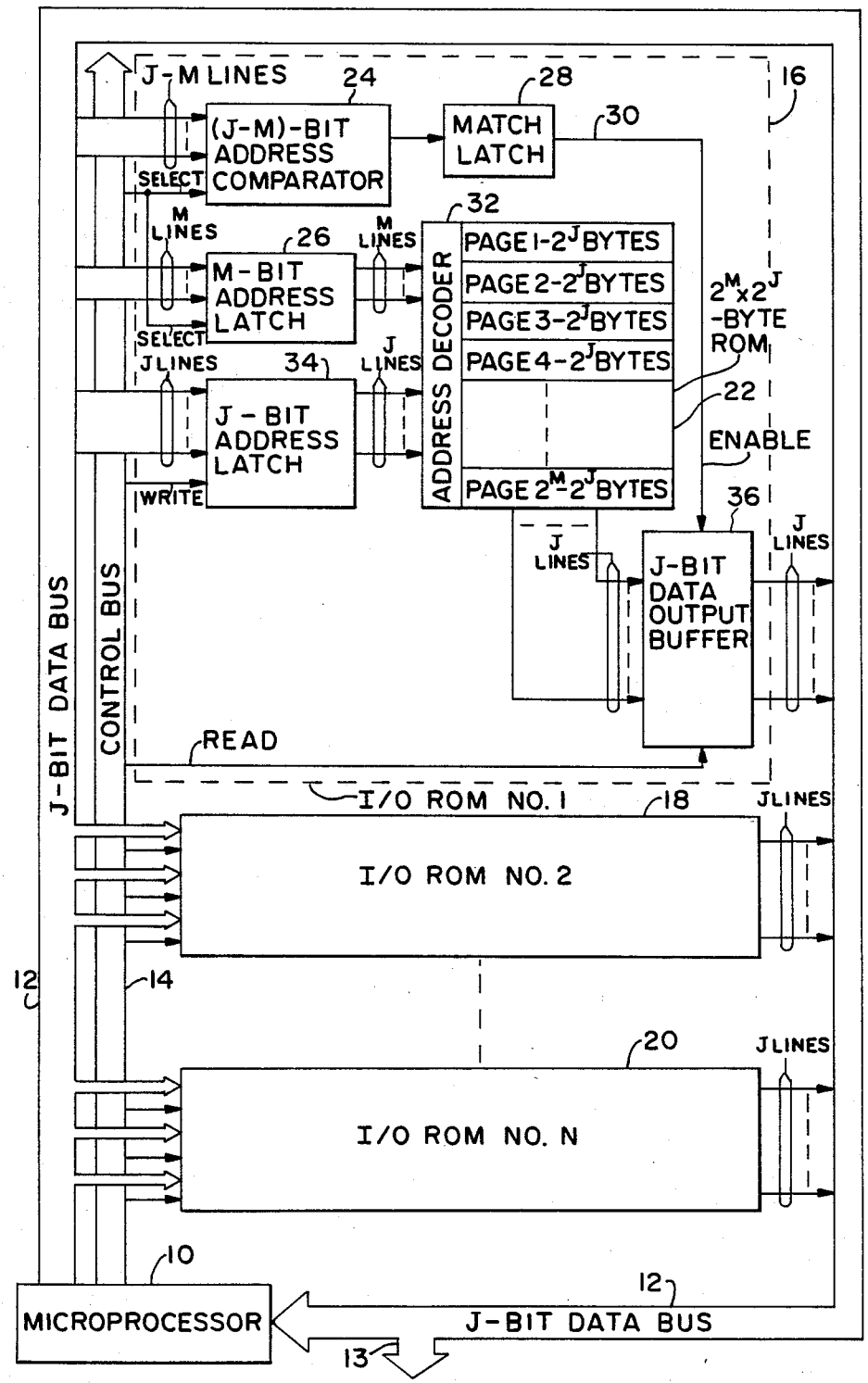

DATA BUS CONTROL OF ROM UNITS IN INFORMATION PROCESSING SYSTEM

BACKGROUND OF THE INVENTION

This invention relates to an information processing system and, more particularly, to an information processing system that includes read-only-memory (ROM) units.

ROMs are nonvolatile memories that are often utilized in information processing systems. In such systems, the ROM memories are designed to perform a variety of functions including data conversion, table look-up, etc.

ROM units can be programmed in any one of various standard ways. Thus, for example, such units can be mask-programmed ROMs, field-programmable (e.g., fusible-link) ROMs, UV-erasable EPROMs or electrically-alterable EAROMs.

Heretofore, ROMs have been interconnected with other components of a processing system in various ways. Typically, the ROMs are connected to both address and data buses in the system. In such an arrangement, the ROMs constitute a portion of the program memory of the system and often entail in practice a considerable amount of instruction overhead. Moreover, such an arrangement of ROMs fragments program space and typically requires a relatively large amount of ROM to store a given amount of information.

Accordingly, efforts have been made by workers skilled in the art directed at trying to devise other ways of incorporating ROMs into a processing system. In particular, these efforts have been aimed at attempting to reduce the amount of ROM required to store a given amount of information and, at the same time, to improve the organization of program space in the system and to reduce the instruction overhead involved in accessing and reading ROMs. It was recognized that these efforts, if successful, could reduce the cost and enhance the mode of operation of processing systems including ROMs.

SUMMARY OF THE INVENTION

In accordance with the principles of the present invention, page-mode-organized ROMs and associated circuitry are connected only to data and control buses in an information processing system. Addressing and reading of the ROMs are carried out under control of a processor without connecting the ROMs to an address bus.

According to a feature of the invention, selection of a particular ROM in an array of ROMs and of a particular page therein is accomplished by applying a first control signal and a first data word to the data bus. This first data word thus serves as the address of the selected page in the selected ROM. Then a particular byte of the selected page is selected by applying a second control signal and a second data word to the data bus. This second data word serves as the address of the selected byte. Subsequently, in response to a third control signal, the selected byte is read out of the selected ROM and applied to the data bus.

More specifically, in a particular illustrative embodiment of applicants' invention, information is stored in a processing system in page-word-organized ROM in $2^J$ pages having $2^J$ bytes per page, where J is a positive integer. During a first cycle of operation of the system, J bits are supplied to a data bus connected to the ROM to select one of the $2^J$ pages. During a second cycle, J bits are supplied to the data bus to select one of the $2^J$ bytes in the selected page. During a third cycle, the selected byte is applied to the data bus. Successive first, second and third control signals are supplied to a control bus connected to the ROM to enable the first, second and third cycles, respectively.

In accordance with another feature of this invention, the information content of the first and second data words applied to the data bus remains stored in the circuitry associated with the ROMs until subsequent respective data words are applied to the data bus by the processor. In that way, the inventive system facilitates accessing data bytes at the same address on several pages of the previously selected ROM or on pages of other subsequently selected ROMs. Further, the system also facilitates accessing data bytes at several addresses of the previously selected ROM and page.

A complete understanding of the present invention and of the above and other features and advantages thereof may be gained from consideration of the following detailed description presented hereinbelow in connection with the accompanying single-figure drawing. The drawing is a schematic representation of a specific illustrative system that embodies the principles of applicants' invention.

DETAILED DESCRIPTION

The specific illustrative system depicted in the drawing includes a conventional microprocessor 10 having a data bus 12 and a control bus 14 connected thereto. The data bus 12 is designed to carry J bits in parallel. As shown in the drawing, the buses 12 and 14 are connected to multiple ROMs and associated circuitry.

By means of data words applied by the processor 10 to the bus 12, and under control of signals applied to the bus 14 from the processor 10, a particular byte at a time is read out of the ROMs and applied to the data bus 12. This mode of operation will be described in detail below.

Each byte read out of the ROMs comprises up to J bits which are applied in parallel to the data bus 12. Illustratively, the bits read out of the ROMs are transmitted by the bus 12 to the microprocessor 10. Also, if desired, these read-out bits can be transmitted to other associated utilization equipment (not shown), as schematically indicated by branch 13 connected to the bus 12.

The quantity J specified herein is a positive integer. By way of example, the minimum value of J in practice is typically 4 and its maximum value is 16. But, in some cases of practical importance, J may assume a value as small as 2. In other such cases, J may be greater than 16.

Illustratively, the data and control buses 12 and 14 shown in the drawing are of the type utilized to transmit information between a processor and input/output (I/O) devices. By means of the bus 12, only data (not address information) is typically sent (written) to or received (read) from a selected I/O device. In such an arrangement, selection of a particular device is determined by signals applied to the control bus 14. Further, initiation of the writing and reading operations for a selected I/O device is also under control of signals applied to the bus 14.

In accordance with applicants' invention, each of the herein-described ROM assemblies comprising a ROM unit and associated circuitry is designed to be connected to and compatible with data and control buses of the general type specified above. Hence, the ROM assemblies connected to these buses closely resemble the aforementioned I/O devices to which data is written and from which data is read. Due to that resemblance, the specific illustrative ROM assemblies described herein and shown in the drawing are each designated as being a so-called I/O ROM.

A system made in accordance with applicants' invention includes one or more ROM assemblies each of which comprises a page-mode-organized ROM and associated circuitry. In the drawing, dashed-line box 16 constitutes one such assembly. Further, the particular depicted illustrative system is represented as including N−1 additional assemblies. Each of the additional assemblies is essentially identical to the assembly 16. Two of these additional assemblies, respectively designated 18 and 20, are depicted in the drawing. As shown, each of the assemblies 16, 18 . . . 20 is connected to receive data and control signals from the buses 12 and 14 and, in response thereto, to apply successive selected bytes of data to the bus 12.

The individual ROMs included in applicants' system are conventional. These can be programmed in any standard way to store information therein for purposes such as data conversion, table look-up, etc.

Each of the ROMs included in applicants' system is organized in a page mode. In accordance with this invention, a total of up to $2^J$ pages can be included in the system. All $2^J$ pages could be included in a single ROM assembly. But, in the specific illustrative system shown in the drawing, the $2^J$ pages are designed to be evenly distributed over N assemblies. Thus, each ROM assembly such as the assembly 16 includes a ROM that comprises $2^M$ pages. In turn, each page of ROM in the depicted illustrative system is capable of storing $2^J$ bytes each of which can contain up to J bits.

The ROM assembly 16 is shown in the drawing as including ROM 22. The ROM 22 comprises $2^M$ pages each containing $2^J$ bytes.

Herein, for purpose of a specific illustrative example, J will be assumed to have the value 8. Hence, each data word applied to the bus 12 from the microprocessor 10 or transmitted to the microprocessor 10 from the depicted ROM assemblies will comprise 8 bits in parallel. By further way of example, M herein will be assumed to have the value 3. Thus, the ROM included in each of the assemblies such as the assembly 16 will include $2^M$ or 8 of the $2^J$ or 256 pages that the system is capable of containing. In that case, the total number N of ROM assemblies in the depicted system would be 32.

In accordance with applicants' invention, the value of M employed herein can be any integer between 1 and J. Thus, if M equals 1 and J equals 8, information would be stored in $2^{J-M}$ or 128 ROMs each having $2^M$ or 2 pages. If M equals 8, information would be stored in a single ROM having 256 pages.

The circuitry associated with the page-mode-organized ROM 22 in the assembly 16 includes a (J−M)-bit address comparator 24. In the particular illustrative example considered herein, the quanity J−M equals 5. The comparator 24 and similar comparators respectively included in the other 31 I/O ROMs are each designed to be responsive to a unique one of $2^5$ or 32 5-bit address segments appearing on the data bus 12 during an initial cycle in which one of the I/O ROMs is selected. (Except for this difference in the address comparators, the circuitry associated with each ROM is identical.) The other 3 bits of each 8-bit data word initially appearing on the bus 12 are applied to an M- or 3-bit address latch 26. The latch 26 serves to select a particular one of the $2^M$ or 8 pages included in each of the 32 ROMs including the ROM 22.

More specifically, during an initial selection cycle, a SELECT signal is applied from the microprocessor 10 via the control bus 14 to the (J−M)-bit address comparator and to the M-bit address latch included in each of the N I/O ROMs. At the same time, an 8-bit data word applied to the bus 12 by the microprocessor 10 is also applied to each I/O ROM. In conjunction with the SELECT signal, five of these 8 data bits serve to select or activate a single one of the 32 address comparators in the I/O ROMs. The other three data bits, also acting in conjuction with the SELECT signal, serve to latch the output of the 3-bit address latch included in each I/O ROM.

Assume that the aforedescribed 5-bit address applied to the data bus 12 corresponds to the address previously assigned only to the comparator 24 in the I/O ROM 16. In response to this address and a SELECT signal, the comparator 24 applies a signal to match latch 28 to cause it to supply an ENABLE signal to its output lead 30. In this way, only the I/O ROM 16 is selected for subsequent read-out of data therefrom.

The particular page from which data stored in the ROM is to be read out is specified by the output of the address latch 26. This output is applied to a conventional address decoder 32. In response thereto, the decoder 32 selects a particular one of the 8 pages included in the ROM 22.

Subsequently, a particular one of the 256 bytes stored on the selected page in the ROM 22 is specified for read-out. This is done by applying a second 8-bit data word from the microprocessor 10 to the bus 12 while simultaneously applying a WRITE signal to the control bus 14. These signals activate the 8-bit address latch included in each 32 I/O ROMs. In response, the outputs of these latches apply an 8-bit word to the respective address decoder included in each I/O ROM. Thus, 8-bit address latch 34 in I/O ROM 16 applies such an 8-bit word to the address decoder 32. As a result, a particular one of the 256 bytes on the previously specified page is selected for read-out.

In each of the 32 I/O ROMs, the 8 bits of the selected byte are read out of ROM and applied in parallel to the 8 inputs of its respective J-bit data output buffer. One such buffer, designated by reference numeral 36, is shown in the drawing.

Upon the subsequent occurrence of a READ signal, only the output buffer in the previously selected I/O ROM is enabled to transfer a selected byte of ROM data to the data bus 12. Thus, when a READ signal is applied from the control bus 14 to the output buffer 36 in selected I/O ROM 16, while the ENABLE signal is also applied to the buffer 36, the selected byte is transferred from the buffer to the data bus 12.

Avantageously, all address latches in the herein-described system remain in their previously latched condition until a different set of control and data bits are subsequently applied thereto. Thus, in the particular illustrative example specified above, the outputs of the 3-bit address latch 26 and the 8-bit address latch 34 remain fixed until a different set of SELECT and 3-bit data signals are applied to the latch 26 and a different set of WRITE and 8-bit data signals are applied to the latch 34.

Similarly, all match latches in the system advantageously remain in their respective latched or unlatched states until subsequent signals are applied thereto from their respective associated address comparators. Thus, for example, once latched, the match latch 28 continues to supply an ENABLE signal on its output lead 30 until the comparator 24 supplies an output signal indicating that in a subsequent select cycle an I/O ROM other than the assembly 16 is being selected for read-out.

The above-described mode of operation of the latches included in each I/O ROM is the basis for facilitating access to the I/O ROMs under certain conditions. Thus, for example, assume that I/O ROM 16 and page 5 thereof have been selected for read-out during the aforedescribed select cycle. Assume further that byte 131 on page 5 is subsequently selected during the write cycle and then read out during the read cycle. Now assume that one or more additional bytes on page 5 of the unit 22 in I/O ROM 16 are to be subsequently read out. Assume, for example, that byte 37 on page 5 is now to be read out of ROM 22. Since the match latch 28 already supplies an ENABLE signal on its output lead 30 and the output of address latch 26 already specifies page 5, another select cycle is not required. Hence, to commence the read-out of byte 37 on page 5, the microprocessor 10 can skip the usual select cycle and immediately jump to a write cycle. Advantageously, such skipping of the select cycle can also be done for immediately subsequent read-out of additional bytes on previously selected page 5 of previously selected I/O ROM 16.

To illustrate an additional capability of the depicted system, assume that I/O ROM 16, page 5, and byte 37 on page 5 have all been most recently selected for read-out. Assume further that in a next subsequent read-out cycle byte 37 on a page other than page 5 of ROM 22 is to be selected for read-out. Such a cycle would commence with the application from the microprocessor 10 to the bus 12 of a new 8-bit word. The 5 of these bits applied to address comparator 24 would remain the same as in the previously assumed cycle. As a result, the match latch 28 would not be reset and the previously generated ENABLE signal would continue to appear on its output lead 30. But the other 3 bits of the new 8-bit word would set the output of the latch 26 to a new page address. In turn, this new address would be translated by decoder 32 to point to a page other than page 5 in ROM 22. Assume, for example, that the new address denoted by latch 26 is that of page 7.

As assumed above, the 8-bit output of latch 34 in I/O ROM 16 already represents the address of byte 37. Hence, in the overall read-out cycle in which byte 37 on page 7 is to be read out, the usual write cycle in which the latch 34 is established to point to a specified byte can be skipped. In other words, under these particular circumstances the usual select cycle can be immediately followed by a standard read cycle, without an intermediate write cycle.

Advantageously, the aforementioned skipping of the write cycle can also be controlled to occur when read-out is desired of the same previously selected byte number on any page in any I/O ROM other than the previously selected I/O ROM 16. This is so because the output of the 8-bit address latch in each of the I/O ROMs is already set to represent byte 37.

Thus, for example, a next read-out cycle designed to read out byte 37 on page 2 of I/O ROM No. 2 would involve an initial select cycle in which the address comparator in I/O ROM 18 would be selected. (At the same time, nonselection of the comparator 24 in previously selected I/O ROM 16 would reset match latch 28 and remove the ENABLE signal from its output lead 30.) Also, during the select cycle, one of the pages in the ROM in assembly 18 would be selected. But then, since the 8-bit address comparator in the I/O ROM 18 is already set to represent byte 37, the usual write cycle can be skipped. Subsequently, in the usual read cycle, byte 37 on page 2 of I/O ROM 18 would be applied to the data bus 12 via an enabled data output buffer in the assembly 18.

Thus, as described above, the standard mode of operation of the depicted system can be modified in meritorious ways under certain specified conditions. As set forth in the particular examples above, such modifications result in advantageous compression of the usual read-out cycle of the system. In one set of examples, the select portion of the overall read-out cycle can be skipped. In the other set of examples, the write portion of the overall read-out cycle can be skipped.

In accordance with applicants' invention, only a data bus normally utilized to carry data is interconnected with ROM. No separate address bus is employed. Words applied to the data bus are effective to achieve read-out of corresponding prespecified words stored in ROM. In that way, direct and efficient conversion or translation between applied data words and read-out words is effected.

In the particular illustrative system detailed herein, wherein 8-bit words are applied to the data bus 12 and SELECT, WRITE and READ signals are applied to the control bus 14, it is apparent that a relatively large amount of ROM information is effectively controlled by a relatively simple bus structure. For example, a bus structure containing only 13 wires (8 data lines, 3 control lines, and power and ground lines) can access any one at a time of 65,536 8-bit bytes of information stored in page-mode-organized ROMs. Further, the ROM information itself occupies no program space. And it has been determined that the aforedescribed accessing and read-out of information from the ROMs in the herein-described system constitutes an efficient mode of operation that involves a relatively small amount of instruction overhead.

Finally, it is to be understood that the above-described arrangements are only illustrative of the principles of the present invention. In accordance with these principles, numerous modifications and alternatives may be devised by those skilled in the art without departing from the spirit and scope of the invention.

What is claimed is:

1. An information processing system comprising
means for storing information in up to $2^J$ pages each having up to $2^J$ bytes per page, where J is a positive integer,
a first bus connected to said storing means,
means for supplying J bits to said first bus for application to said storing means during a first cycle to select one of said pages,
means for supplying J bits to said first bus for application to said storing means during a second cycle to select one of said bytes in said selected page,
means for applying said selected byte from said storing means to said first bus during a third cycle,
a second bus connected to said storing means, and means for supplying successive first, second and third signals to said second bus to enable said first, second and third cycles, respectively, wherein said first- and second-mentioned supplying means comprise a microprocessor, wherein said storing means comprises a page-mode-organized read-only-memory unit, an address decoder connected to said unit for selecting a particular byte on a particular page of said unit, an M-bit address latch responsive to M of the bits supplied to said first bus during said first cycle and to said first signal supplied to said second bus for applying signals to said address decoder representative of the selected one of said pages, where M is a positive integer equal to or less than J, and a J-bit address latch responsive to the J bits supplied to said first bus during said second cycle and to said second signal supplied to said second bus for applying signals to said address decoder representative of the selected one of said bytes on said selected page, wherein said applying means comprises a J-bit output buffer responsive to said third signal from said second bus and connected between said read-only-memory unit and said first bus for receiving said selected byte read out of said unit, wherein said storing means comprises N of said page-mode-organized read-only-memory units, each of said units including up to $2^M$ pages, where $N \times 2^M$ equals $2^J$, and wherein each of said units has connected thereto one of said address decoders, one of said M-bit address latches, one of said J-bit address latches and one of said J-bit output buffers.

2. A system as in claim 1 wherein each of said N units is characterized by a unique (J−M)-bit address and includes a (J−M)-bit address comparator responsive to J−M of the bits supplied to said first bus during said first cycle and to said first signal supplied to said second bus for selecting a particular one of said units for read-out when its respective characteristic address appears on said first bus during said first cycle.

3. A system as in claim 2 wherein each of said N units further includes a match latch connected to the (J−M)-bit address comparator in its respective unit and responsive to its respective comparator indicating selection of said unit for read-out by applying an ENABLE signal to its respective J-bit output buffer, whereby only the selected byte in said selected unit is applied to said first bus during said third cycle.

* * * * *